United States Patent Office 3,660,478
Patented May 2, 1972

3,660,478
CYCLIC RECRYSTALLIZATION PROCESS
John Nasser, New Canaan, Conn., assignor to
Mobil Oil Corporation
Continuation-in-part of application Ser. No. 576,754,
Sept. 1, 1966. This application Mar. 7, 1969, Ser.
No. 805,187
Int. Cl. C07c *51/42, 51/48*
U.S. Cl. 260—525                                    18 Claims

ABSTRACT OF THE DISCLOSURE

Continuous cyclic leaching and/or recrystallization of a slurry of an excess of solid terephthalic or another benzene carboxylic acid in a saturated solution thereof in a solvent (acetic acid) at an elevated temperature level (285–580° F.) wherein slurry recirculating in a loop system is alternately cooled 1 to 20° F. to recrystallize 1 to 10% of the solute and similarly heated elsewhere to dissolve an equivalent amount of solids in 10 or more heating-cooling cycles by recirculating the slurry in a ratio of at least 10:1 based on the amount of treated slurry being withdrawn continuously. Direct or indirect heat transfer may be used for either heating or cooling, as unheated charge slurry may provide direct cooling or the charge may be preheated for direct heating of the recirculating slurry; also the product slurry may be cooled and then recycled to the loop as a direct coolant.

CROSS-REFERENCES TO RELATED APPLICATIONS

This application is a continuation-in-part of my application Ser. No. 576,754 filed Sept. 1, 1966 (now abandoned).

Certain features or techniques disclosed herein for the purpose of fully illustrating various aspects of the instant process are also disclosed and claimed per se in my application Ser. No. 576,764 filed Sept. 1, 1966 and the following copending applications: Ser. No. 576,724 (now abandoned filed on Sept. 1, 1966 by Griffith et al., Ser. No. 576,765 (now U.S. Pat. 3,549,695) filed on Sept. 1, 1966 by Bryant et al. and Ser. No. 576,753 (now abandoned) filed on Sept. 1, 1966 by Mauldin. The present claims include novel combinations of the teachings of said application Ser. No. 576,753 (now abandoned) with those of the present invention.

BACKGROUND OF THE INVENTION

The invention relates to a recrystallization process of a cyclic nature wherein a crystalline aromatic carboxylic acid in suspension in a saturated solution thereof in a solvent medium is partially dissolved and then recrystallized in recurring succession. The process has application in the purification and in the controlled crystallization of normally solid benzene carboxylic acids in general. In one particular embodiment, it is concerned with the purification of terephthalic acid. At least some degree of leaching occurs in addition to recrystallization in this cyclic process, and a separate and prior leaching step may be utilized in combination with the new recirculation process.

In the production of high quality polyesters, such as polyethyleneglycol terephthalate, for use in films, fibers and as a base for magnetic sound tapes, polymeric material of high purity is essential in obtaining the necessary physical properties of high tensile strength, dimensional stability, etc., in the final product. In turn, this means that the raw materials employed in preparing the polymers must also have extremely low contents of impurities.

Typical commercial specifications for terephthalic acid require that the content of lower oxidation products therein, be kept below about 300 parts per million (hereinafter p.p.m.) by weight and there is an increase in demand for a grade of terephthalic acid containing less than 75 p.p.m. of such impurities. Such purity requirements are not easy to meet inasmuch as the crude terephthalic acid crystals separated from the products of the partial oxidation of a relatively pure para-xylene even under carefully controlled oxidation conditions frequently contain up to about 5% of lower oxidation products, principally p-carboxybenzaldehyde and p-toluic acid. These impurities are rather difficult to remove from terephthalic acid inasmuch as they have a pronounced tendency for occlusion inside the crystals of said acid. The instant process is suitable for reducing the content of such impurities by at least 65% by weight, and in operating under preferred conditions it is possible to obtain reductions of 80 to 90% or more in the case of both p-carboxybenzaldehyde and p-toluic acid; also determinations by the American Public Health Association method in both sulfuric acid and dimethylformamide indicate very substantial decreases in the content of color body impurities. Still higher degrees of purification are obtainable by subjecting the recrystallized product to repetitions of this process with a fresh solvent medium and/or to other purification techniques which may include sublimation.

SUMMARY OF THE INVENTION

The present invention is a recrystallization process which comprises recirculating a slurry containing a crystalline benzene carboxylic acid suspended in a saturated solution thereof in a solvent medium around a closed system into which a stream of charge slurry is at least intermittently introduced for recrystallization and from which a stream of recrystallized slurry product is at least intermittently and separately being withdrawn, repeatedly heating said recirculating slurry through a small temperature differential in at least one heating zone in said system, and repeatedly cooling said heated slurry through substantially the same small temperature differential to a predetermined recrystallization temperature in at least one cooling zone in said system.

More specific aspects of the invention relate to continuous cyclic recrystallization; the correlation of the volumetric flow rates of charging slurry thereto and of recirculating slurry therein to provide an average of at least about 10 complete heating-cooling cycles; and also sufficient to provide a flow velocity sufficient to maintain undissolved crystals in suspension; preferred small temperature differentials in the circulation system, especially at a temperature wherein there is a marked change in solubility per degree F. change in temperature; a recrystallization of at least about 0.2% by weight (preferably between about 1 and 10%) of the dissolved solute in each pass through the cooling zone; supplying the heat required in the heating operation in the recirculation loop by charging a heated slurry and/or by indirect heat transfer; the periodic reversal of the functions of indirect heating and indirect cooling zones; cooling the recirculating slurry by direct heat exchange with a cooler charge slurry or with a cooler recylced product slurry; cooling the product slurry by evaporation prior to recycling a portion of that slurry to the recrystallization step; purifying terephthalic acid; utilizing certain classes and specific solvent media (e.g., acetic acid); employing temperature or mild fluid coolants for cooling recirculating slurries, and the combination of leaching in a separate zone followed by the cyclic recrystallization.

Numerous advantages may be obtained with the present process including a more uniform and higher degree of purification of crude material, better control of crystal size, shorter treating times, more efficient heating and cooling and reduced fouling of equipment.

DESCRIPTION OF SPECIFIC EMBODIMENTS

Although the instant cyclic recrystallization process is described in considerable detail hereinafter in connection with the purification of the commercially important terephthalic acid using acetic acid as the preferred solvent medium, it is to be understood that the new method is applicable to the controlled partial dissolving the recrystallizing of other benzene carboxylic acids, including benzoic, the isomeric toluic, the isomeric phthalic and 5-tertiary butyl isophthalic acids, in appropriate solvent liquids, at suitable temperature levels for controlling the crystal size and/or purifying an impure material. The choice of the solvent will, of course, depend upon the solubility characteristics of the crystalline substance being treated and of any foreign matter to be removed therefrom; and the properties of the selected solvent in turn will largely determine the optimum recrystallization temperature.

The proportions of solvent and crystalline benzene carboxylic acid in the charge mixture are determined by the operating conditions within the recirculation system wherein the slurry always contains the crystalline substance in two states, namely, as the solute of a saturated solution and as undissolved crystals suspended in that solution. The presence of undissolved crystals at all times in the recirculation loop eliminates any possibility of forming a supersaturated solution which might interfere with the desired control of the recrystallization operation. Therefore, the charge mixture should contain an excess of the crystalline substance over the amount which will dissolve in the solvent medium at the maximum temperature encountered in the circulation loop. In instances where a charge mixture is subjected to leaching or a solution treatment at a high temperature prior to the recrystallization operation, complete solution of the solids in the charge during the preliminary stage may be unobjectionable but does not appear to provide any significant advantages. However, an unlimited excess of undissolved crystals cannot be present in the recirculation system for the slurries must be fluid enough to be pumped or otherwise transported at all temperatures encountered in the process. In addition, there are indications that a higher degree of purification is obtainable with less concentrated slurries, but this must be balanced against the extra cost of handling a larger volume of slurry. On the other hand, less deposition or "plating" of solids on the walls of piping and vessels appears to take place with slurries containing higher proportions of undissolved solids, possibly due to a scouring action of the slurry flow or the greater surface area for deposition provided by the additional crystalline material or both. In any event, the solvent should be present in sufficient amount to dissolve any free or unoccluded foreign matter which is to be removed. As an illustration, the recrystallizing slurry may usually contain about 2 to 32% undissolved solids based on the total slurry weight, and this corresponds generally to a total concentration of about 5 to 40% of the crystalline material in the mixture in the case of terephthalic acid.

The recrystallization cycles of this process involve heating and cooling through relatively small temperature differentials of up to about 30° F. For example, less than about 20° F. in many cases, and preferably not more than about 5° in each indirect cooling zone when a slurry of terephthalic acid in acetic acid is cooled by indirect heat exchange as this minimizes the plating of solids on heat transfer surfaces. To dissolve and recrystallize a significant amount of the solid material with such minor temperature changes, the mean temperature of the recirculating slurry must be maintained at a level at which a narrow temperature differential produces a marked change in the solubility of the crystalline material compared to the changes in solubility at other temperature levels. This, however, does not require a high concentration of dissolved solids in the solution. For example, it is often desirable to recrystallize and then dissolve an amount of solids equal to at least about 1% of the dissolved solute (not total crystalline material present) but usually not more than about 10% thereof in each complete cycle of the slurry around the recirculation system.

The average number of such solution-recrystallization cycles to which the slurry is subjected will, of course, depend upon the volumetric flow rate ratio of slurry recirculated to slurry withdrawn from the system. The optimum residence time and number cycles is best determined for each particular charge mixture by experimentation and analysis of the product for purity and/or crystal size. The average residence time may be calculated in the usual manner by dividing the volume of the recirculation system by the volumetric flow rate of withdrawing product slurry, such factors customarily being correlated in advance to provide a suitable period. Similarly, the cycle frequency in this closed system may be computed by dividing its volume by the volumetric flow rate of recirculating the slurry. For most purposes, it is contemplated that the recirculating slurry should preferably be subjected to more than about 10 complete heating-cooling cycles. In general, the shorter the residence time and the smaller the number of such cycles in this controlled recrystallization, the better, so long as the desired purity and/or crystal size of the product are attained. In the case of terephthalic acid dispersed in acetic acid, excellent results are obtainable with a residence time of about 22 minutes and an average of about 66 recrystallization cycles when operating with a temperature differential of the order of about 1 to 4° F. at a mean temperature level within the range of about 285 to 420° F. In the upper part of this range, the leaching effect is more pronounced, but the charge slurry for recrystallization is usually a slurry which has already been subjected to substantially higher leaching temperatures as described hereinafter.

Also, it is desirable to maintain a sufficiently high recirculation flow velocity through the closed system to keep all of the solid matter present in suspension by means of the turbulence of the flow. This may not always be possible throughout the entire recirculation system, as for instance where a holding tank or crystallizing vessel as employed in one illustrated embodiment herein to increase the recrystallization residence time may require mechanical agitation to maintain a uniform slurry with no settling of solids in the tank. Conventonal rotating mechanical agitators are avoided as much as possible when high pressure and high temperature operations are involved inasmuch as leakage problems are likely to be encountered with the seal or packing gland located at the point where the agitator shaft enters a closed vessel of this type. Moreover, in some cases it is contemplated an agitator can be dispensed with in a holding tank of moderate size by constructing the tank with a steeply sloping conical bottom so that there are substantially no horizontal surfaces on which settling solid particles may lodge and then employing downward flow of slurry through this tank. In one illustrated embodiment of the present process the use of a holding tank is avoided by providing a sufficient volume of slurry space in heat exchangers and piping and maintaining a high enough velocity therein to keep the solids in suspension.

It is often advantageous to subject an impure crystalline substance to a preliminary leaching operation at a substantially higher temperature than is employed primarily for recrystallization (e.g., at least 50° F. higher) for the purpose of dissolving a greater quantity of occluded foreign matter. In the case of leaching terephthalic acid with aqueous acetic acid, temperatures of the order of about 400 to 580° F. are recommended for a leaching residence time of say one or more minutes. A single leach-recrystallization operation may be carried out in the lower part of that temperature range, but in case of leaching temperatures above about 430° F., it is generally desirable to have a separate recrystallization step at an intermediate temperature level at least 50° lower and in the 285–420° range. In order to simplify the process by charging the slurry of leached material directly to the recrystallization system, the same solvent in a quantity suitable for the recrystallization step is recommended for the charge to the leaching step. At least 10%, and preferably more than 40, of the solid charge is usually dissolved in leaching.

Various leaching techniques are suitable for the present purposes as exemplified by turbulent flow of the leach mixture through externally heated pipe coils as described hereinafter, or the vertical column leaching of the aforesaid application Ser. No. 576,765 or by continuously passing the mixture through a leach tank provided with an internal heating coil and a suitable agitation means.

It is not necessary to dissolve the entire quantity of impure crystalline material in leaching, and complete solution is frequently undesirable, since it may require either employing excessively large quantities of the solvent or leaching temperatures so high that the resulting vapor pressures of the solvent would be undesirably high.

A solvent medium employed for both leaching and recrystallization should be one in which there is a marked difference in solubility of the acid undergoing purification, for example a three-fold change in solubility over a reasonably small temperature change of 100 or 200° F. For convenience and economy this, temperature differential should preferably be located within a moderately elevated range of temperatures. For instance, operations which require either artificial refrigeration for recrystallization or high temperatures above about 600° F. for leaching are generally not very desirable.

In the case of terephthalic acid, acetic acid is the preferred solvent, especially when it has a small content of water, since such an acid is the predominant component of the liquid reaction medium in several types of oxidation processes for synthesizing terephthalic acid, and acetic acid is in fact generated or formed during the reaction when methyl ethyl ketone is present. Accordingly, the use of acetic acid as the leaching and recrystallization solvent simplifies the overall manufacture of terephthalic acid in regard to the number of agents employed, recovered and stored in carrying out the process. Other suitable solvents include the other lower aliphatic monocarboxylic acids containing from 2 to 8 carbon atoms per molecule as exemplified by propionic, normal butyric, isobutyric, valeric, trimethylacetic, caproic and caprylic acids as well as water, para and other xylenes, tetrahydrofuran, N,N-dimethylformamide, N,N-dimethylacetamide, and ketones, such as methyl ethyl ketone and methyl isobutyl ketone. All of these are inert in that they do not react with terephthalic acid, even at high temperatures.

Acetic acid has especially suitable solvent characteristics inasmuch as the solubility of the terephthalic acid therein is relatively low up to about 375° F. but thereafter increases rapidly so that terephthalic acid is moderately soluble in temperatures in the preferred leaching range of about 420° F. and up. The lower oxidation products of p-xylene (the principal impurities of terephthalic acid produced by oxidation) are considerably more soluble than terephthalic acid in the acetic acid; thus all, or substantially all, impurities of this nature in the free or unoccluded state at any stage in the present process tend to be retained in solution while the terephthalic acid recrystallizes.

When the primary object of the cyclic recrystallization process is to control the particle size of the crystals being formed, this may be accomplished by regulating the process conditions. Increasing the residence time, increasing the number of heating-cooling cycles to increase the total amount of solid material being recrystallized and redissolved, and decreasing the slurry temperature drop across the cooling zone each tend to increase the average crystal size; and the converse is true where crystals of smaller size are desired.

While the slurry leaching of solid materials in saturated solutions and the recrystallization both involve equilibria between some solid material continuously dissolving and some of the solute continuously precipitating, there is ordinarily little or limited control over these equilibrium actions. The present process of alternately heating and cooling a recirculating benzene carboxylic acid slurry does provide positive and easy control over the total amount of solid acid which is dissolved and recrystallized within the system at a selected temperature level, for that weight is directly proportional to the controlled total heat input to the heating zone of the system. Moreover, it also provides unusual flexibility as to the selection of operating temperatures for even at relatively low temperatures where the solubility of the solid acid is low low that very little material can be dissolved by ordinary techniques and the leaching action is ineffective, numerous small quantities of solids are dissolved in the cyclic process and these small quantities add up to a very large total amount of solids being dissolved at one time or another when the rate of withdrawing slurry is adjusted to produce a large number of recirculation cycles, and a highly efficient leaching action is provided at a temperature which is normally considered unsuitable. Similarly, large total amounts of material may be recrystallized in the cyclic treatment at temperature levels where only a small amount of the solute can ordinarily be recrystallized.

DESCRIPTION OF THE DRAWINGS

For a better understanding of the nature and objects of this invention, reference should be had to the accompanying drawings wherein like numerals designate the same or similar apparatus and to the detailed disclosure hereinafter in which all proportions are expressed in terms of weight and all temperatures as degrees Fahrenheit (° F.) unless otherwise stated. The drawings are schematic in nature and many conventional accessories in the form of valves, control instruments and other auxiliary equipment have been omitted for greater clarity inasmuch as such devices and their utilization are well known to those skilled in the art.

FIG. 1 is a flow sheet of one embodiment of a continuous process according to the present invention wherein the recirculating slurry received heat from the introduction of a hotter leach slurry.

FIG. 2 is a flow sheet of another embodiment of the instant invention in which the recirculating slurry is heated by indirect heat transfer.

FIG. 3 is a flow diagram of still another embodiment of the invention in which a relatively cold charge slurry is introduced to cool the recirculating slurry and is illustrated in a continuous leaching operation.

These illustrative embodiments described certain features which are also disclosed and claimed in certain of the aforesaid applications; however, these features are optional here as they are not essential in all modifications of the present process or for the recrystallization of all benzene carboxylic acids.

Turning now to FIG. 1, a crude filter cake of terephthalic acid crystals is charged along with acetic acid to a crude slurry tank 10 wherein a rotating agitator 12 is driven by a suitable motor 14 reslurries the solids to form a relatively uniform dispersion of about 8 to 20% of the terephthalic acid (e.g., 15% of the total slurry weight) in the liquid. The crude terephthalic acid may be obtained from any suitable source, such as the oxidation of p-xylene according to the procedure disclosed in Ardis et al. Pat. No. 3,036,122. This crude cake often contains 10 to 20% weight of reaction mother liquor consisting mainly of acetic acid, and its approximate dry composition typically 98% terephthalic acid with 1% p-carboxybenzaldehyde and 1% p-toluic as the principal impurities. The leaching solvent is desirably acetic acid containing about 1 to 4% water by weight, and it may be recovered from the aforesaid oxidation process and the instant process by a distillation operation (not shown).

The resulting slurry is withdrawn from the bottom of tank 10 in the transfer line 16 and forced by a multi-stage, slurry pump assembly 18 at high pressure through the pipe 20 into leach slurry preheater 22 equipped with a continuous titanium pipe coil 24. By the combustion of fuel gas in furnace 22, the slurry charge in coil 24 is heated from ambient or a slightly elevated temperature (e.g., 145°) to a temperature of 420° F. before the slurry enters the leach soaking unit 26.

Leach soaking coil 28 is a continuation of the preheating coil 24 and about 350% of the length of the latter. The slurry is maintained at 420° while it is passing through coil 28 by any appropriate means, such as collecting part or all of the flue gas from the slurry heater 22 together with sufficient air at ambient temperature to suitably moderate the temperature of the flue gas and then passing this gaseous mixture under induced draft through the double wall casing 30 surrounding coil 28 in the soaking oven 26. Since this leaching temperature is well above the atmospheric boiling point of acetic acid, the coils are maintained under a pressure of about 400 or more p.s.i.g. to prevent boiling of the slurry, and the same is true of the adjoining crystallizing section.

Coils 24 and 28, as well as other apparatus elements described herein as exposed to acetic or similar acids at temperatures above about 300°, are preferably constructed of titanium or clad or lined with this metal or other material of similar corrosion and heat resistance in order to avoid contaminating the product with corrosion products. At temperatures below 300°, a chromium-nickel stainless steel of 18-8 type may be used, as it provides suitable corrosion resistance at those temperatures at a lower equipment cost.

This leaching operation is of relatively short duration for the total residence time in the coils 24 and 28 is only about nine to ten minutes. The solubility of terephthalic acid in 97 percent acetic acid at 420° is approximately 3 percent by weight; thus, when a slurry of the preferred concentration of about 15 percent terephthalic acid is charged, most of the terephthalic acid remains in the crystalline form in suspension in the liquid medium. In a slurry of this type containing excess or undissolved solids suspended in a saturated solution of the leaching solvent, initially there is essentially only a dissolving action as the slurry temperature rises in the heating coil 24, then there is a continuing equilibrium in the soaking coil 28 between crystalline material dissolving and solute recrystallizing with a consequent breaking down of the structure of the original terephthalic acid crystals and a reconstitution thereof accompanied by a release of most of the p-carboxybenzaldehyde and p-toluic acid in the original crystals. These two impurities are more soluble than terephthalic acid in the hot acetic acid and they are present in much lower concentration therein; hence there is less tendency for them to be occluded again during recrystallization of the terephthalic acid.

Settling of the suspended particles and accumulation of solid deposits on the bottom of the pipe coils, especially at the return bends, is prevented by maintaining an adequate velocity of flow through the coils 24 and 28 and by the arrangement of the piping. For example, a velocity of about 3 feet per second or more is suitable in handling this particular slurry of terephthalic acid crystals in acetic acid through an essentially horizontal coil of 3-inch pipe. The minimum or saltation velocity in any particular case is dependent on a variety of factors, some of which are difficult to measure or evaluate; hence a suitable velocity is usually best determined by experimentation with the particular slurry.

The leach slurry leaving coil 28 at 420° is delivered by the short conduit 32, which is jacketed and heated with flue gas to prevent chilling and consequent deposition of solids therein, to the recrystallizing loop system where it joins a flow of recrystallizing slurry of 70 times its volume in line 34. This recirculation system comprises a high capacity circulating pump 36 of a type suitable for handling slurries, a cooler 38, a crystallizing vessel 40 provided with a suitable agitator 42 driven by a motor 44 to prevent settling of the crystals and the connecting pipes 34, 46, 48 and 50 which complete the loop. Continual recirculation of a large proportion of the slurry through this loop system with repeated alternate heating and cooling of the circulating slurry in different zones of the loop serves here to partially dissolve and partially recrystallize the terephthalic acid in recurring cycles. Direct heating of the circulating slurry occurs at the junction with the hot leach slurry entering from pipe 32 and cooling takes place in indirect heat exchanger 38 with a suitable fluid coolant being introduced from supply line 52 and withdrawn in pipe 54.

A large flow of recrystallizing slurry at 325° is drawn out of the vessel 40 in the bottom line 34 where it is joined by a considerably smaller flow of the hotter leached slurry. Such mixing quickly chills the leach slurry entering from line 32 and recrystallizes a major proportion of its dissolved terephthalic acid while the average temperature of the stream in line 34 is being raised about 1.3°, thereby redissolving a small proportion of the crystalline solids in the slurry flowing out of the bottom of crystallizer 40. Pump 36 then forces the mixed slurries through the pipe 46 through the tubes of the shell-and-tube heat exchanger 38 in which the temperature of the slurry stream is cooled to 325° by indirect heat exchange to recrystallize only a small proportion of the dissolved terephthalic acid. To avoid sudden chilling of the slurry in contact with the tubes and consequent rapid fouling thereof with crystalline deposits, a temperate coolant is dersirably introduced into the cooler at a temperature about 25 to 50° F. below the temperature of the circulating slurry. The cooled slurry stream exits in pipe 48 and then divides between the return line 50 and the discharge conduit 56 in a volumetric ratio of 70:1. Thus, return line 50 carries a large flow back to the crystallizing vessel 40 and a much smaller flow of the recrystallized slurry is taken off in pipe 56 for further processing. It will be appreciated that the rate of withdrawing the recrystallized slurry in line 56 corresponds to the rate of introducing leached slurry from coil 28 into the crystallizing system.

Although only a small proportion of the dissolved terephthalic acid in the total recirculating stream is recrystallized and redissolved in each complete cycle through the crystallizing system, nevertheless the flow rate is so high that individual crystalline aggregates or crystals of terephthalic acid are repeatedly partially dissolved and then built up by recrystallization. This cyclic repetition of a partial erosion of crystals followed by their reconstitution apparently tends to freely release adsorbed and occluded foreign matter or impurities from the terephthalic acid crystals into an ample quantity of solvent for dissolving such impurities and thereby produce terephthalic acid crystals of higher purity than the crystals obtained by conventional recrystallization techniques. For example, in comparative tests under conditions closely approximating those described for the embodiment of FIG. 1, it was found that the elimination of p-carboxybenzaldehyde from the terephthalic acid by the instant process was about one-fifth higher than in an otherwise similar process wherein the leach slurry was recrystallized by cooling and agitation in a tank but without cyclic heating and cooling.

Excellent results are obtainable with an average residence time in the crystallizing lop of 22 minutes and a slurry recirculation flow rate providing a frequency of slightly over 3 heating-cooling cycles per minute which subjects the slurry to an average of 70 cycles of dissolving and recrystallizing. By reason of the high recirculation rate, the overall rate of terephthalic acid being dissolved and recrystallized is relatively high, amounting to about 7.6% of the terephthalic acid throughout in addition to the approximately equal quantity of initial recrystallization occurring in the slurry entering the crystallizing loop, despite the fact that the recirculating slurry is heated and cooled over a temperature differential of only about 1.3° F. Such small temperature changes in the recirculating slurry seen not only to improve the purity of the recrystallized solid material but also to substantially reduce the deposition or plating of terephthalic acid crystals in the tubes of the cooler 38, which is a constant and annoying problem in processes of this nature. There are also indications that the high circulation rate of the slurry with its relatively high content of solid particles produces a scouring action that minimizes the fouling of those tubes.

Although other temperatures may be utilized here in treating terephthalic acid with acetic acid, it is generally preferable to adopt the technique of the aforesaid application Ser. No. 576,724 now abandoned of recrystallizing terephthalic acid from the hot leach slurry in one or more stages at relatively high intermediate temperatures (e.g., 285 to 420°) which are at least about 50° below those employed for leaching (e.g., 400 to 580°) and substantially higher than the subsequent filtration temperature (e.g., 160–220°) to obtain terephthalic acid crystals containing consideraably less of the impurities than when the leach slurry is cooled directly to a temperature suitable for filtering or otherwise separating these crystals from the slurry. Subsequent cooling of a slurry recrystallized at the elevated intermediate temperature to the same separation temperature (e.g., 180°) apparently does not significantly reduce the purity of the crystals.

After leaving the crystallizer section, the recrystallized product slurry flows through pipe 56 leading to the first of two automatic pressure control valves 58 and 60. The first or upstream pressure control valve 58 is set for about 300 or more pounds per square inch gauge (p.s.i.g.) to prevent vaporization of the slurry at the high temperatures developed in the leach coil 28, as well as at the intermediate temperature of the crystallizing sections, and the second or downstream valve 60 is set for a pressure of 100 p.s.i.g. to prevent flashing across valve 58. Relatively cool product slurry (e.g., at 180°) from a storage and cooling tank 62 is recycled by pump 64 via lines 66, 68 and 70 to pipe 72 to lower the temperature of the slurry between the two valves to the range of about 200–230° in order to reduce flashing across the second control valve 66 to an acceptable level (e.g., 15% of the liquid) and prevent plugging of the valve and excessive wear due to erosion from the slurry with its relatively high content of about 15% solids which would quickly render the valve inoperative.

Such pressure reductions can also be effected in three or more stages depending on the range of pressures involved and two or more interstage cooling operations may be employed. In other applications, the instant process may be carried out at atmospheric pressure or a single stage of pressure reduction may suffice.

After the pressure let-down, the recrystallized slurry is transported in line 74 to tank 62. This storage tank, which is provided with an agitator 76 driven by an electric motor (not shown), may be maintained at an absolute pressure of 6 to 9 p.s.i. The entering slurry is cooled further in tank 62 to a temperature of 180° by the application of suction to draw vapor from the vapor space above the liquid level in tank 62 overhead through line 78 and condenser 80 which is connected via pipe 82 to the gas-liquid separator 84. Suction is provided by a steam or water jet ejector 86 connected to the separator by line 88. This ejector maintains the subatmospheric pressure on this part of the system and exhausts any incondensable gas or vapor to the atmosphere. The liquid condensed by cooling in condenser 80 and chiefly consisting of acetic acid and water is returned in line 90 to tank 62 below the liquid level therein. The cooling of slurry in this tank 62 is produced mainly by the boiling or rapid evaporation of the liquid and to a lesser extent the return of the cooled condensate at a temperature of about 120° to the slurry. This is a preferred method of cooling the slurry, inasmuch as there are no solids in the vapor reaching the condenser 80 to foul the tubes therein.

The cooled slurry is drawn off from tank 62 in bottom line 66 and transported by pump 64 and transfer line 68 for separation of the purified crystals from the dissolved foreign matter in a suitable device. A vacuum filter (not shown) may be employed to recover the crystals which may be washed thereon with acetic acid or water, and the mother liquor may be recycled to the aforementioned oxidation process.

Another type of cooling may be employed in conjunction with the present process, namely, the method of cooling of the aforesaid application Ser. No. 576,753, now abandoned. In this particular version of the present process, the cooling in the crystallizing loop of FIG. 1 may be accomplished either wholly or in part by direct heat transfer between the heated recirculating slurry and a cooler product slurry which has been cooled after discharge from the recrystallizing step and then returned to the crystallizing section from storage tank 62. To accomplish this recycling,, a portion of the product slurry flowing in line 70 is diverted through the branch line 92 and pumped by means of a high pressure, multistage, slurry pump 94 through the pipe 96 back to the crystallizing system to either replace or supplement the cooling provided by heat exchanger 38. This requires the opening of the valves in lines 92 and 96, which are kept closed during the operating procedure described hereinbefore, and also the operation of the pumping device 94.

Cooler 38 is subject to some fouling by the deposition of crystals on the cooling tube surfaces in contact with the slurry, and the direct heat exchange reduces or eliminates such fouling. When the recrystallization cooling is accomplished entirely by direct heat transfer, the exchanger 38 can be bypassed, eliminated or the flow of indirect cooling medium therethrough may be dispensed with. However, in some instances it may be desirable to employ a combination of cooling by both indirect and direct heat exchange using a reduced flow of the coolant through indirect cooler 38 together with a reduced flow of the recycled product slurry. By thus absorbing at least a portion of the cooling load with the cooler recycle slurry, the onstream time of the exchanger 38 may be increased considerably.

Despite the increase in pumping costs and larger recrystallization loop equipment entailed in recycling product slurry for cooling, it is contemplated that it will be desirable in certain cases to transfer as much as possible of the cooling load of the present crystallizing system to the cooling system of storage tank 62 inasmuch as substantial fouling problems are not likely to be encountered there by reason of the evaporation cooling technique employed.

The process illustrated in FIG. 1 involves cooling the hot leach slurry through a substantial temperature interval to the recirculating slurry temperature, and this occurs so rapidly, in fact almost instantaneously, that it is equivalent to a quenching action. Ordinarily, the rapid cooling or chilling of a saturated solution produces undesirable effects in the form of such rapid crystal formation that the product crystals contain almost all or at least a major proportion of the original impurities and also a rapid and heavy deposition of crystals on the chilled surfaces of indirect cooling equipment. Both of these effects are caused by the creation of a temporary substantial degree of supersaturation in the solution by the rapid chilling. Another advantage of the present process is the high recirculation rate which prevents such undesired effects here because the hot slurry is "quenched" in a much larger volume of recirculating slurry flowing fast enough to produce such rapid mixing that the liquid medium of the combined slurries is never supersaturated to any significant extent; moreover, the hot slurry is never in contact with chilled surfaces in the crystallizing loop.

There are still other modifications possible in the general process shown in FIG. 1, which are useful if difficulties arise from the rapid fouling of the tubes in cooler 38 with crystalline deposits. For example, the single cooler 38 in the drawing may be replaced with two similar coolers arranged in parallel and with each having separate pipe connections provided with valves and connecting one end of each cooler to the inlet line 46 and the other end thereof to the outlet line 48. With this expedient, the flow of recirculating slurry may be periodically alternated between the two coolers to maintain one cooler in service while the alternate cooler is shut down for removal of the solid deposits by appropriate means such as a flow of hot acetic acid to dissolve light deposits and very high velocity jets of water to remove heavy deposits.

It is also contemplated that two or more similar coolers in series may be substituted for the single cooler 38 of FIG. 1. In this modification, any one of the series heat exchangers in proper alternate sequence may be operating either on a standby basis with the coolant shut off and the recirculating slurry flowing therethrough without being either heated or cooled or for cleaning by moderate heating with a fluid heating medium while the full flow of circulating slurry quickly dissolves the deposits inside the tubes; meanwhile, the cooling duty is being handled by one or more other heat exchangers of the series. The parallel arrangement of heat exchangers is preferred over the series arrangement as capable of maintaining a more constant temperature in the exit line 48 and also offering less resistance to the flow of the slurry.

FIG. 2 illustrates a different embodiment of the invention in which the heat required in the cyclic recrystallizing process is supplied by indirect heat exchange. In one respect, this is a system in which a more pronounced leaching effect in the recirculation loop may be combined with the recrystallization operation described earlier, especially when operating at a higher temperature.

In this system, a charge slurry of crude terephthalic acid filter cake in acetic acid of the type described earlier is pumped at high pressure through charge line 20 into the preheater 100 wherein the slurry is heated from about 150°, for example, to a temperature of 280°. Line 102 then carries the preheated slurry at 100 gallons per minute under a pressure of 200 p.s.i.g. from the heater 100 to the loop conduit 104 of considerably large diameter in a recirculation loop where it joins a stream or recirculating slurry of the same composition withdrawn from the heater 106 at a temperature of 404° and a high flow rate of 20,000 gal./min. The mixed slurries are drawn at 403.3° into a high volume slurry pump 108 of the axial flow or propeller type which forces them through transfer line 110 to the indirect cooler 112. This shell-and-tube cooler utilizes a temperate boiling water coolant supplied as hot water under pressure through line 114 and leaving as steam in pipe 116 at about the same temperature for only slightly reducing the temperature of the circulating slurry to 400° to recrystallize it. The cooled and recrystallized slurry enters the transfer conduit 118 and then is divided between the return conduit 120 and the discharge line 122 in a volumetric flow ratio of 200:1, respectively. Return line 120 carries most of the slurry back to the indirect heat exchanger 106 where it is again heated to 404° by means of a suitable fluid heating medium introduced into the shell through line 124 and withdrawn in pipe 126. A small proportion of the recrystallized slurry is withdrawn through pipe 122 and is subjected to the pressure reduction and further processing mentioned previously.

In effect, this a combined leaching and recrystallizing system operating in a cyclic fashion. By regulating the amount of heat supplied to the heater 106 and the heat removed in the cooler 112 in conjunction with the output of pump 108, it is possible to control the rate of dissolving and recrystallizing material in the recirculation loop. For instance, with an hourly slurry charge rate of 7,500 pounds of terephthalic acid in 45,000 pounds acetic acid together with a heat input of 24 million B.t.u. per hour in heater 106 and a heat removal of 20.4 million B.t.u. per hour in cooler 112 (heat absorbed by the charge accounting for the difference), it is possible to dissolve and precipitate 7,500 pounds per hour of terephthalic acid (an amount equal to the total throughput) even though the solubility of terephthalic acid in acetic acid is only about 2% by weight at 400° F. Keeping the leach or dissolving temperature and the recrystalling temperature within a few degrees of one another minimizes the degree of temporary supersaturation on cooling and tends to produce larger and purer crystals.

As before, the volume of the recirculation system together with the input of the fresh slurry determines the average residence time in the system.

It will be noted that the average temperature of this particular recirculating loop operation is approximately 75° higher than that of the process described in FIG. 1, and this is desirable for increasing the leaching effect here as no prior leaching operation is employed in this case. For a slurry of terephthalic acid in acetic acid, it is preferable to carry out this particular embodiment of the process at a temperature level between about 350 and 430° F. Higher temperatures are less desirable in raising the solubility of terephthalic acid to the point where the mode of cooling and further crystallization after leaving the recirculation loop become important as p-carboxybenzaldehyde tends to be crystallized along with or occluded in the terephthalic acid and the problem of preventing fouling of the cooler tubes becomes more difficult. However, fouling may be minimized by using velocities above 12 feet/sec. in the cooler. On the other hand, an average loop temperature below this range would require a great increase in the heat input and removal to dissolve and recrystallize a suitable amount of terephthalic acid as the temperature-solubality curve flattens out.

A particular advantage of the process modification illustrated in FIG. 2 is the fact that the recirculation loop contains both an indirect heater and an indirect cooler, for this enables one to reverse the functions of these two heat exchange devices in the event of scaling or deposition of crystals in the cooler. The use of a temperate or mild fluid coolant in the cooler tends to minimize this deposition, but it is still likely to occur in some cases. In such event, this condition may be corrected very simply by heating the cooler 112 with a suitable fluid heating medium to dissolve the crystalline deposits in the slurry flowing through the tubes, and simultaneously cooling the heater 106 with an appropriate fluid cooling medium.

While this reversal of operations may be performed with the simplified system illustrated in the drawing with relatively good results, it would be preferable on a long-time basis to add an alternate conduit for delivering the slurry charge in line 102 to the loop conduit 120 and to add an alternate discharge line connecting the loop conduit 104 to the discharge conduit 122. Then the product slurry would still be withdrawn from the cooled recrystallized stream in the loop and the fresh slurry charged on the opposite side of the loop to eliminate any "short circuiting" tendency.

In the process modifications described in connection with FIG. 2, the slurry has been described as entering at a temperature substantially below that of the average temperature of the recirculating slurry in the loop, however, that is not essential to these operations. The charge slurry may be introduced at the temperature of the slurry leaving heater 106, or even somewhat higher, particularly in view of the relatively low charge rate in comparison with the flow of the recirculating slurry as this will merely require some readjustment of the heating and cooling duties of the heat exchangers 106 and 112. However, in most cases it will still be desirable to operate the process in such manner that a considerable amount, and preferably a major proportion, of the heat input to the circulating loop is supplied by the indirect heat exchanger 106. The process of FIG. 2 differs from the FIG. 1 modifications in this particular respect.

FIG. 3 is concerned with another modification of the invention wherein the cyclic solution-recrystallization treatment is illustrated in an operation that may be described as predominantly cyclic leaching at higher temperatures, and a subsequent recrystallization operation at an intermediate temperature level is often required for optimum product purity. The instant leaching treatment also involves alternate heating and cooling of the recirculating slurry but all of the cooling is accomplished by introducing a relatively cool charge slurry into the loop; hence no cooling apparatus is required in this modification.

For illustration, a slurry like that prepared in the slurry tank 10 of FIG. 1 but having a total terephthalic acid content of 25% and a temperature of about 140° F. is pumped at a rate of 100 gal./min. under a pressure of 500 p.s.i.g. through the line 20 in FIG. 3 to enter the loop system and mix with a flow of 2650 gal./min. of the hot (490° F.) recirculating leach slurry in the return conduit 128 immediately upstream of the enlarged conduit section or tank 130 which serves as a cooling and recrystallization zone of sufficient volume to provide the desired overall residence time in the loop system. The mixing of the two slurry streams cools the recirculating slurry from the conduit 128 about 16° F. to precipitate a portion of the solute therein whereas the charge slurry from line 20 is strongly heated which results in leaching of the suspended terephthalic acid by dissolving part of it.

The slurry mixture then passes through a transfer conduit 134, which has a large diameter like that of conduit 128, at a temperature of 474° F. on its way to the axial flow circulating pump 136 which propels the slurry through the tubes of the heater 138 wherein the slurry is indirectly heated to a temperature of 490° F. A shell and tube heat exchanger is suitable for the purpose and this is desirably heated by a high boiling liquid heating medium, introduced at 650° F. through the supply line 140 and discharged via the pipe 142 after providing countercurrent heat exchange with the slurry.

After leaving the heat exchanger 138 as a slurry containing slightly less of the terephthalic acid in suspension and somewhat more in solution, the stream is divided into two parts with one stream with a flow of 2650 gal./min. recirculating through the return conduit 128 while a much smaller stream flowing at a rate of 120 gal./min. is taken off in line 32 as the leach product slurry. The volumetric rate of withdrawing product slurry is higher than the slurry charging rate as a result of thermal expansion of the slurry within the loop. This loop system has a volume of 760 gal. and the average residence time is consequently about 6 minutes. The recirculation product flow ratio of 22:1 provides an average of 22 complete heating-cooling cycles while the slurry is in the closed leach system and the result is a highly efficient leaching action.

Alternatively, where it is desirable to remove the product slurry at about 16° lower temperature, the product may be discharged through line 132 upstream of the heater instead of using line 32. However, this procedure introduces an element of risk in that some "short-circuiting" may occur in that a larger than usual proportion of fresh slurry introduced in line 20 may be withdrawn in the discharge line 132 before it has completed even a single pass through the loop system.

Inasmuch as this loop leaching system is operating at a temperature level above the optimum for terephthalic acid recrystallization, the leached slurry leaving in either line 32 or 132 is desirably subjected to a subsequent recrystallization operation at an intermediate temperature level (i.e., above the temperature at whcih the slurry is filtered later) using a mean temperature of about 350° F. While other methods may be used in that recrystallization operation, it is preferably carried out by the cyclic technique of the present invention. For example, the leached slurry may be processed further in the manner described for the hot leach slurry in line 32 of FIG. 1 with the hot leach product slurry furnishing all the heat necessary for cyclic recrystallization while indirect cooling and/or direct cooling with relatively cool product slurry recycled from tank 62 to the recrystallization loop system may be used for cooling.

It will also be appreciated that the process embodiment of FIG. 3 can be operated at a mean recirculation temperature level approximating 400° F., similarly to the process described in connection with FIG. 2 (except for eliminating preheater 100 and indirect cooler 112) to provide a combined leach-recrystallization procedure that does not require a subsequent separate recrystallization operation.

While the process of the present invention has been described hereinabove in only a few specific embodiments of continuous operations employing the same crystalline material and same solvent for simplicity and better comparison, it will be apparent to those skilled in the art that there are many other possible modifications of the novel process which may involve the purification of other benzene carboxylic acids, the use of different solvents, other recirculation temperature levels and temperature differentials, etc. Accordingly, this invention should not be construed as limited in any particulars except as set forth in the appended claims or required by the prior art.

What is claimed is:

1. A recrystallization process which comprises continuously recirculating a slurry containing solid particles of a crystalline benzene carboxylic acid suspended in a saturated solution thereof in a solvent medium around a closed system into which a stream of a charge slurry is at least intermittently introduced for recrystallization and from which a stream of recrystallized slurry product is at least intermittently and separately being withdrawn, repeatedly heating said recirculating slurry through a temperature differential of from about 1 to about 30° F. in at least one heating zone in said system to partially dissolve from about 0.2 to about 10% of the suspended solid particles of said acid in said recirculated slurry, and repeatedly cooling said heated slurry through substantially the same temperature differential to a predetermined recrystallization temperature in at least one cooling zone in said system to recrystallize from about 0.2 to about 10% of the solute in said heated slurry, said process being further characterized in that the volumetric flow rate of charge slurry to said closed system is correlated with the volumetric flow rate of the recirculating slurry to provide an average of at least about ten complete heating-cooling cycles while maintaining at all times in said system a slurry containing undissolved suspended crystals of said acid.

2. A process according to claim 1 in which said slurry comprises terephthalic acid.

3. A process according to claim 2 in which said cooling operation is carried out at a temperature level wherein there is a marked change in the solubility of terephthalic acid in said solvent medium per degree F. change in temperature.

4. A process according to claim 2 in which said temperature differential in cooling does not exceed about 5° F. in any indirect cooling zone.

5. A process according to claim 2 in which said solvent medium comprises a solvent of the group consisting of water, aliphatic monocarboxylic acids having from 2 to 8 carbon atoms per molecule, xylenes, methyl ethyl ketone, tetrahydrofuran, N,N-dimethylformamide and N,N-dimethylacetamide.

6. A process according to claim 2 in which an impure terephthalic acid containing minor proportions of p-carboxybenzaldehyde and p-toluic acid is at least partially purified by recrystallization from a solution containing at least a major proportion of acetic acid.

7. A process according to claim 2 in which at least a substantial part of said heating is accomplished by introducing said charge slurry into said closed system at a substantially higher temperature than said recrystallization temperature.

8. A process according to claim 2 in which said cooling is accomplished by the indirect exchange of heat between said recirculating slurry and a fluid coolant introduced into said indirect heat exchange relationship at an initial temperature between about 25 and 50° F. below the temperature of said heated recirculating slurry.

9. A process according to claim 2 in which impure terephthalic acid is subjected to a prior leaching operation in said solvent medium in a separate zone at a temperature substantially higher than the temperature of said heated recirculating slurry for a period sufficient to dissolve at least a major proportion of soluble impurities associated with said terephthalic acid, and the resulting hot leach mixture is introduced as said charge slurry into said closed system to provide at least a substantial proportion of the heat required in said heating step.

10. A process according to claim 2 in which said cooling operation is accomplished in said closed system by direct heat exchange in which a portion of the recrystallization product slurry withdrawn from said closed system is cooled to a temperature substantially lower than said recrystallization temperature and thereafter returned to said recirculating slurry in said cooling zone.

11. A process according to claim 10 in which said recrystallization product stream is subjected to cooling by means including evaporation prior to returning a portion thereof to said recirculating slurry.

12. A process according to claim 2 in which at least a substantial proportion of the heat required in said heating operation is supplied by indirect heat exchange in said heating zone and said cooling is accomplished by indirect heat exchange with a coolant fluid.

13. A process according to claim 12 in which said charge slurry is introduced into said closed system at a temperature not substantially in excess of the temperature of said recirculating heated slurry.

14. A process according to claim 2 in which the functions of the heating zone and the cooling zone are both substantially simultaneously reversed at periodic intervals in order to remove solid deposits from the cooling zone.

15. A process according to claim 2 in which at least a substantial part of said cooling is accomplished by introducing said charge slurry into said closed system at a substantially lower temperature than the temperature of said recirculating slurry.

16. A process according to claim 15 in which said charge slurry is subjected to leaching temperatures in said closed system and the slurry product withdrawn therefrom is subjected to recrystallization in a second said closed system wherein said heating is accomplished by the heat content of said product slurry and said second recrystallization temperature is at least 50° F. lower than the initial recrystallization temperature.

17. A process according to claim 2 of subjecting said slurry to at least two of said solution-recrystallization processes in separate closed systems operating at substantially different temperature levels in which said charge slurry is initially introduced into a closed leaching system at a substantially lower temperature than that of the recirculating slurry to provide direct cooling of a cyclic leaching operation wherein the recirculating slurry is indirectly heated in a heating zone, and the slurry withdrawn from said leaching system is thereafter introduced into a closed recrystallization system at a temperature at least 50° F. higher than that of the slurry recirculating therein to provide direct heating of a cyclic recrystallization operation in which the recirculating slurry is cooled in a cooling zone.

18. A process according to claim 1 in which said benzene carboxylic acid is impure, and saturated solution thereof contains a solvent for at least one foreign substance associated with said impure acid and the quantity of said solvent is sufficient for dissolving all of said foreign substance present in the free state at any time during the process.

References Cited
UNITED STATES PATENTS

| | | | |
|---|---|---|---|
| 2,857,429 | 10/1958 | Bruson et al. | 260—525 |
| 3,171,856 | 3/1965 | Kurtz | 260—525 |
| 3,364,256 | 1/1968 | Ichikawa et al. | 260—525 |

OTHER REFERENCES

Weissberger, ed., "Technique of Organic Chemistry, Part I, Separation and Purification," 1956, pp. 509–510.

Weissberger, ed., "Technique of Organic Chemistry, Part II, Laboratory Engineering," 1957, pp. 157 and 159.

LORRAINE A. WEINBERGER, Primary Examiner

R. S. WEISSBERG, Assistant Examiner

UNITED STATES PATENT OFFICE
CERTIFICATE OF CORRECTION

Patent No. 3,660,478            Dated May 2, 1972

Inventor(s) John Nasser

It is certified that error appears in the above-identified patent and that said Letters Patent are hereby corrected as shown below:

Column 1, line 43, after "abandoned" add --)--
Column 2, line 62, change "recylced" to --recycled--
Column 2, line 65, change "temperature" to --temperate--
Column 3, line 10, after "dissolving" change "the" to --and--
Column 4, line 45, change "Conventonal" to --Conventional--
Column 5, line 24, before "change" add --  or six-fold--
Column 5, line 26, delete "," after "this"; insert --,-- after "economy"

Column 6, line 15, after "is" change "low low" to --so low--
Column 6, line 60, after "12" delete "is"
Column 6, line 69, after "composition" add --is--
Column 8, line 66, change "lop" to --loop--
Column 8, line 73, change "throughout" to --throughput--
Column 9, line 23, change "consideraably" to --considerably--
Column 11, line 70, after "this" add --is--
Column 12, line 38, change "solubality" to --solubility--

Signed and sealed this 8th day of January 1974.

(SEAL)
Attest:

EDWARD M. FLETCHER, JR.
Attesting Officer

RENE D. TEGTMEYER
Acting Commissioner of Patents